US011433657B2

(12) United States Patent
Jung et al.

(10) Patent No.: US 11,433,657 B2
(45) Date of Patent: Sep. 6, 2022

(54) METHOD OF PEELING OFF PROTECTIVE FILM AND A METHOD OF MANUFACTURING A DISPLAY DEVICE

(71) Applicant: Samsung Display Co., LTD., Yongin-si (KR)

(72) Inventors: Wu Hyeon Jung, Seoul (KR); Do Hyung Ryu, Yongin-si (KR); Dae Yang Bak, Yongin-si (KR); Dae Hyun Hwang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/797,860

(22) Filed: Feb. 21, 2020

(65) Prior Publication Data

US 2020/0290337 A1    Sep. 17, 2020

(30) Foreign Application Priority Data

Mar. 13, 2019   (KR) .................. 10-2019-0028518

(51) Int. Cl.
*B32B 38/10* (2006.01)
*B32B 37/12* (2006.01)

(52) U.S. Cl.
CPC .............. *B32B 38/10* (2013.01); *B32B 37/12* (2013.01); *B32B 2457/20* (2013.01); *Y10T 156/1046* (2015.01); *Y10T 156/1168* (2015.01); *Y10T 156/1174* (2015.01); *Y10T 156/1195* (2015.01); *Y10T 156/1978* (2015.01); *Y10T 156/1994* (2015.01)

(58) Field of Classification Search
None
See application file for complete search history.

(56) References Cited

U.S. PATENT DOCUMENTS 8,986,486 B2 *  3/2015  Takamoto ........... H01L 21/6835
                                                    156/257
9,522,511 B2 * 12/2016  Lee ..................... B26D 3/065

FOREIGN PATENT DOCUMENTS

| KR | 101818473   | 1/2018 |
| KR | 101820880   | 3/2018 |
| KR | 101837042   | 3/2018 |
| KR | 1020190047168 | 5/2019 |

OTHER PUBLICATIONS

Machine Translation into English of description of KR20130060879 A to Ho, published Jun. 10, 2013, 25 pages. (Year: 2013).*

* cited by examiner

*Primary Examiner* — Linda L Gray
(74) *Attorney, Agent, or Firm* — Cantor Colburn LLP

(57) ABSTRACT

A method of peeling off the protective film includes: providing a panel lower sheet, where a protective film is provided on one surface of the plane lower sheet and the protective film has a bending line extending in a first direction parallel to opposing sides thereof; gripping a portion of the protective film; moving the gripped portion of the protective film in a second direction which is a thickness direction thereof; and moving the panel lower sheet in a third direction perpendicular to the bending line.

20 Claims, 22 Drawing Sheets

METHOD OF PEELING OFF PROTECTIVE FILM AND A METHOD OF MANUFACTURING A DISPLAY DEVICE

This application claims priority to Korean Patent Application No. 10-2019-0028518, filed on Mar. 13, 2019, and all the benefits accruing therefrom under 35 U.S.C. § 119, the content of which in its entirety is herein incorporated by reference.

BACKGROUND

1. Field of the Disclosure

The disclosure relates to a method of peeling off a protective film and a method of manufacturing a display device including the method of the peeling off the protective film.

2. Description of the Related Art

A display device is a device which displays an image and typically includes a display panel such as an organic light-emitting display panel or a liquid crystal display panel. A panel lower sheet is typically attached to a lower portion of the display panel. The panel lower sheet may include various functional sheets for protecting the display panel from heat, external impact, and the like. In addition, the panel lower sheet may further include an input auxiliary device such as a digitizer or a driving device, which is difficult to be disposed on an upper portion of the display panel.

The panel lower sheet may include a panel lower sheet substrate and a protective film. The protective film protects the panel lower sheet substrate during manufacture and transport of the panel lower sheet. In a case where the panel lower sheet is attached to the display panel during a manufacturing process, the protective film may be peeled off to be removed.

SUMMARY

In a display device where a panel lower sheet is attached to a display panel including a bending portion during a manufacturing process, pre-forming may be performed to precisely align the display panel and the panel lower sheet before the panel lower sheet is attached to the display panel. When the pre-forming is performed in a state in which the protective film is attached to one surface of the panel lower sheet, a bending portion is also formed on the protective film. When the protective film includes the bending portion, it may be difficult to peel off the protective film from the panel lower sheet.

Embodiments of the disclosure provide a panel lower sheet including a protective film which reduces a release force when the protective film is peeled off.

Embodiments of the disclosure also provide a method of peeling a protective film off and a method of manufacturing a display device which reduce a release force when the protective film including a bending portion is peeled off.

An embodiment of a method of peeling off a protective film includes providing a panel lower sheet, where a protective film is provided on one surface of the panel lower sheet and the a protective film has a bending line extending in a first direction parallel to opposing sides thereof; gripping a portion of the protective film; moving the gripped portion of the protective film in a second direction which is a thickness direction thereof; and moving the panel lower sheet in a third direction perpendicular to the bending line.

A method of manufacturing a display device includes providing a panel lower sheet substrate, where a protective film is provided on one surface of the panel lower sheet and the protective film is pre-formed to have a bending line extending in a first direction parallel to opposing sides thereof; peeling off the protective film; and after the peeling off the protective film off, attaching a display panel to the one surface of the panel lower sheet substrate. In such an embodiment, the peeling off the protective film includes: gripping a portion of the protective film using a clamping device in a way such that one side of the clamping device is parallel to the bending line, moving the gripped portion of the protective film in a second direction which is a thickness direction thereof, and moving a panel lower sheet in a third direction perpendicular to the bending line.

BRIEF DESCRIPTION OF THE DRAWINGS

The above and other features of the disclosure will become more apparent by describing exemplary embodiments thereof in detail with reference to the attached drawings, in which.

DETAILED DESCRIPTION

Figure 1:
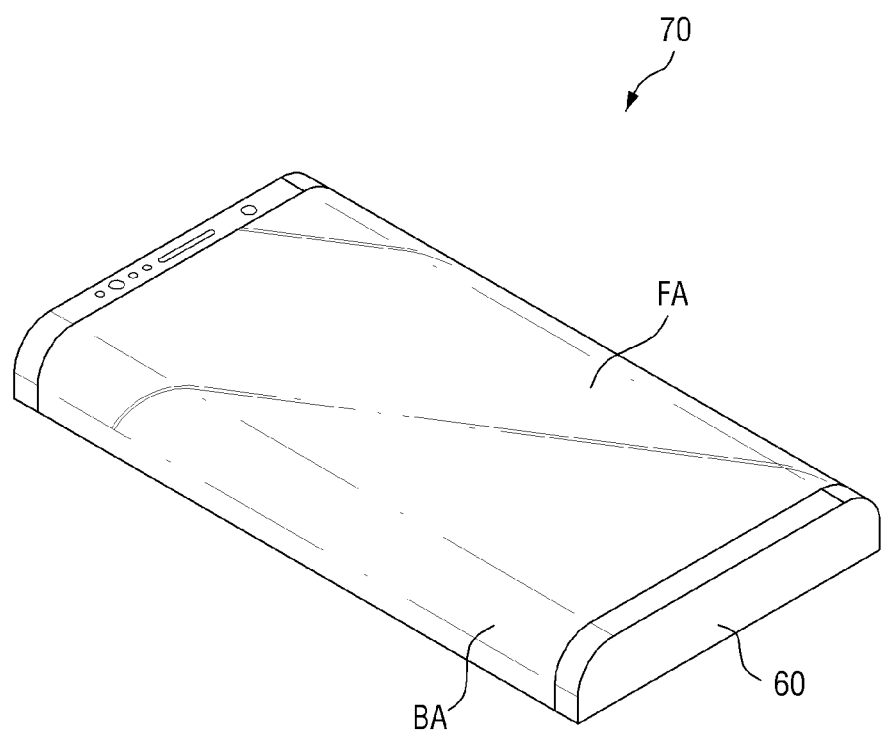
FIG. 1 is a perspective view illustrating a display device according to an exemplary embodiment.

The invention now will be described more fully hereinafter with reference to the accompanying drawings, in which various embodiments are shown. This invention may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the disclosure will be described in detail with reference to the accompanying drawings.

Figure 2:
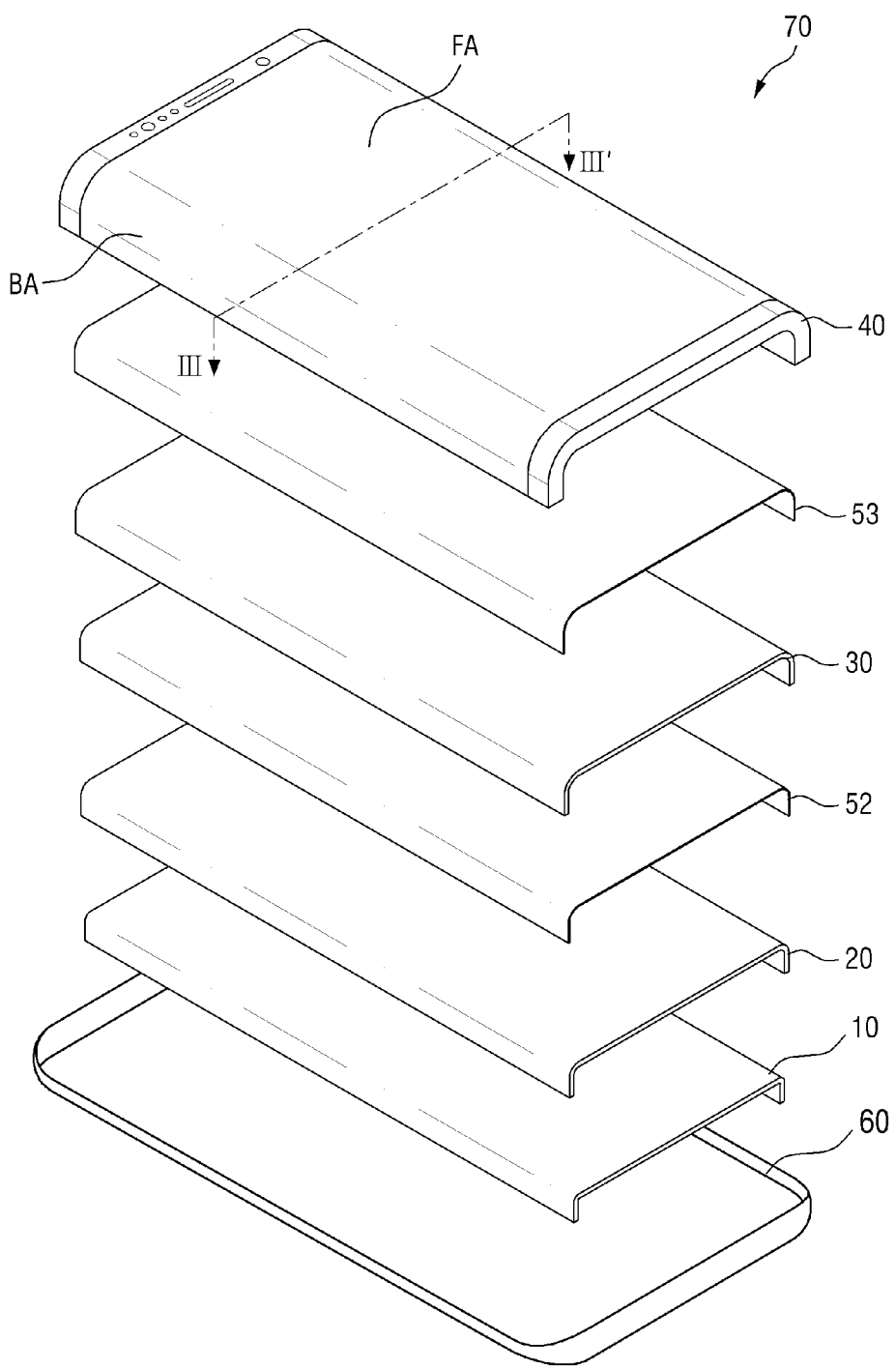
FIG. 2 is an exploded perspective view illustrating the display device of FIG. 1.
Figure 3:
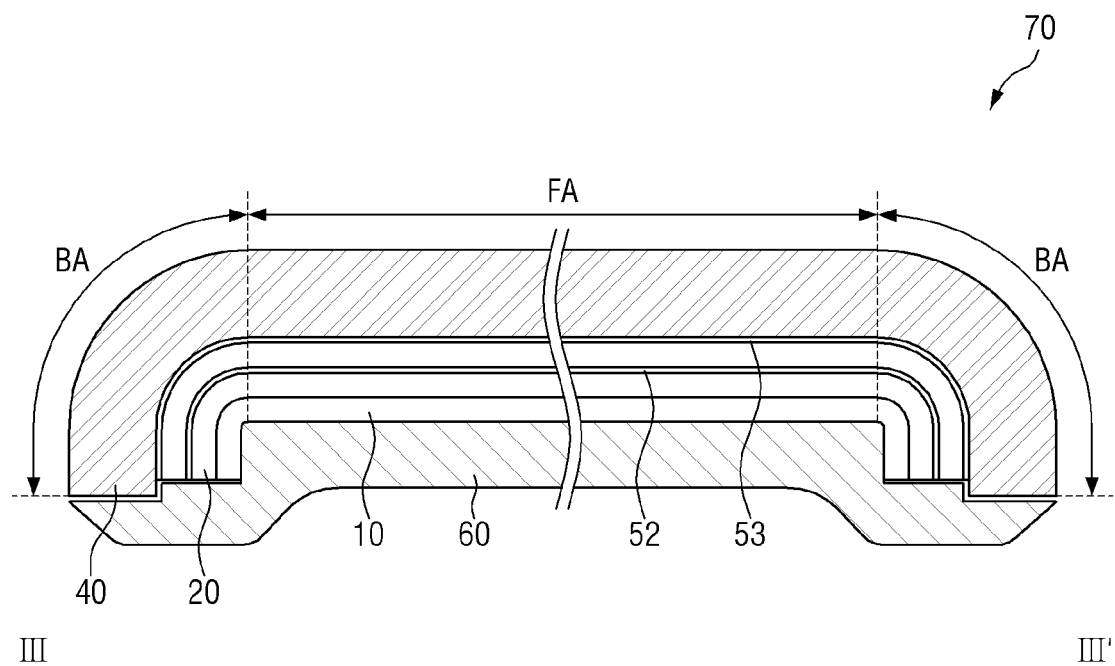
FIG. 3 is a cross-sectional view taken along line of FIG. 2.

FIG. 1 is a perspective view illustrating a display device according to an exemplary embodiment. FIG. 2 is an exploded perspective view illustrating the display device of FIG. 1. FIG. 3 is a cross-sectional view taken along line III-III' of FIG. 2.

Referring to FIGS. 1 to 3, an exemplary embodiment of a display device 70 includes a display panel 20 and a panel lower sheet 10 disposed below the display panel 20. The display device 70 may further include a window 40 disposed on the display panel 20. In such an embodiment, the display device 70 may further include a bracket 60 disposed below the panel lower sheet 10.

Unless otherwise defined herein, the terms "upper portion," "top," and "upper surface" refer to a display surface side with respect to the display panel 20, and the terms "lower portion," "bottom," and "lower surface" refer to a side opposite to a display surface with respect to the display panel 20.

The display device 70 may have a rectangular shape in a plan view. The display device 70 may have both long sides and both short sides. A corner at which the long side meets the short side on) meets the long side may be right angled or may have a curved shape as shown in FIG. 1. However, a plan view shape of the display device 70 is not limited to the illustrated shape, but the display device 70 may have a circular shape or other shapes in a plan view.

The display panel 20 is a panel which displays an image, and may be, for example, an organic light-emitting display panel. Hereinafter, for convenience of description, exemplary embodiments where the display panel 20 is an organic light-emitting display panel will be described in detail, but the disclosure is not limited thereto, and the display panel 20 may be one of other types of display panels such as a liquid crystal display device, an electrophoresis device, and the like.

The display panel 20 includes a plurality of organic light-emitting elements disposed on a substrate. The substrate may be a rigid substrate including or made of a glass or the like or a flexible substrate including or made of polyimide or the like. In an exemplary embodiment, where the substrate is the polyimide substrate, the display panel 20 may be bendable, foldable, or rollable.

The window 40 is disposed on the display panel 20. The window 40 is disposed on the display panel 20 to protect the display panel 20 and transmit light emitted from the display panel 20. The window 40 may include or be made of a glass or the like.

The window 40 may be disposed to overlap the display panel 20 and cover a front surface of the display panel 20. The window 40 may be larger than the display panel 20. In one exemplary embodiment, for example, the window 40 may further protrude outward from the display panel 20 at both short sides of the display device 70. In such an embodiment, as shown in FIG. 3, the window 40 may protrude outward from the display panel 20 even at both long sides of the display device 70, but a protrusion distance at the both short sides may be greater than that at the both long sides.

In an exemplary embodiment, a touch member 30 may be disposed between the display panel 20 and the window 40. The touch member 30 may be a rigid panel type, a flexible panel type, or a film type. The touch member 30 may have substantially a same size as the display panel 20 and be disposed to overlap the display panel 20, and a side surface of the touch member 30 and a side surface of the display panel 20 may be aligned with each other, but the disclosure is not limited thereto. The display panel 20 and the touch member 30 as well as the touch member 30 and the window 40 may be coupled by transparent coupling layers 52 and 53 including or made of an optical clear adhesive ("OCA"), an optical clear resin ("OCR"), or the like. In an alternative exemplary embodiment, the touch member 30 may be omitted. In such an embodiment, the display panel 20 and the window 40 may be coupled by a transparent coupling layer including or made of an OCA, an OCR, or the like. In an alternative exemplary embodiment, the display panel 20 may include a touch electrode portion therein.

The panel lower sheet 10 is disposed below the display panel 20. The panel lower sheet 10 may be attached to a lower surface of the display panel 20 by an OCA, an OCR, a pressure sensitive adhesive ("PSA"), or the like.

The panel lower sheet 10 may have substantially a same size as the display panel 20 and be disposed to overlap the display panel 20, and a side surface of the panel lower sheet 10 and the side surface of the display panel 20 may be aligned with each other, but the disclosure is not limited thereto. The panel lower sheet 10 may perform a heat dissipation function, an electromagnetic wave shielding function, a pattern visibility prevention function, a grounding function, a buffering function, a strength reinforcing function, and/or a digitizing function. The panel lower sheet 10 may include a functional layer having at least one function of the above-described functions. The functional layer may be provided in any form such as a layer, a membrane, a film, a sheet, a plate, or a panel.

The panel lower sheet 10 may include one or more functional layers. In an exemplary embodiment, where the panel lower sheet 10 includes a plurality of functional layers, the functional layers may be stacked to overlap each other. A functional layer may be stacked directly on another functional layer or disposed on another functional layer through a coupling layer.

Other alternative exemplary embodiments of the panel lower sheet 10 will be described in greater detail below.

The bracket 60 is disposed below the panel lower sheet 10. The bracket 60 accommodates the window 40, the touch member 30, the display panel 20, and the panel lower sheet 10. The bracket 60 may have a bottom surface and sidewalls. The bottom surface of the bracket 60 faces a lower surface of the panel lower sheet 10, and the sidewalls of the bracket 60 face side surfaces of the window 40, the touch member 30, the display panel 20, and the panel lower sheet 10.

Although not shown in the drawing, waterproof tape may be disposed at an edge of the bottom surface of the bracket 60. The waterproof tape disposed adjacent to the long side may be attached to the lower surface of the panel lower sheet 10, and the waterproof tape disposed adjacent to the short side may be attached to a lower surface of the window 40.

In an exemplary embodiment, the display device 70 may include a flat portion FA and a bending (bended or cured) portion BA connected to the flat portion FA and disposed at a periphery of the flat portion FA. The flat portion FA is generally flat and disposed on a plane. The bending portion BA is not disposed to be coplanar with the flat portion FA. In one exemplary embodiment, for example, the bending portion BA may be bent or curved in a downward direction from the plane on which the flat portion FA is disposed.

In an exemplary embodiment, the bending portion BA may include a curved surface which is convexly curved in an outward direction thereof. In an alternative exemplary embodiment, the bending portion BA may include a flat surface, and the flat surface of the bending portion BA may be disposed on a plane forming a certain angle with the plane of the flat portion FA.

The bending portion BA may be disposed at both long sides or one long side of the display device 70 having the rectangular shape. Alternatively, although not shown in the drawing, the short side of the display device 70 may also be bent.

In an exemplary embodiment, as described above, all of the display panel 20, touch member 30, window 40, panel lower sheet 10, and bracket 60 may be disposed in the flat portion FA and the bending portion BA.

Hereinafter, an exemplary embodiment of the panel lower sheet 10 will be described in greater detail.

Figure 4:
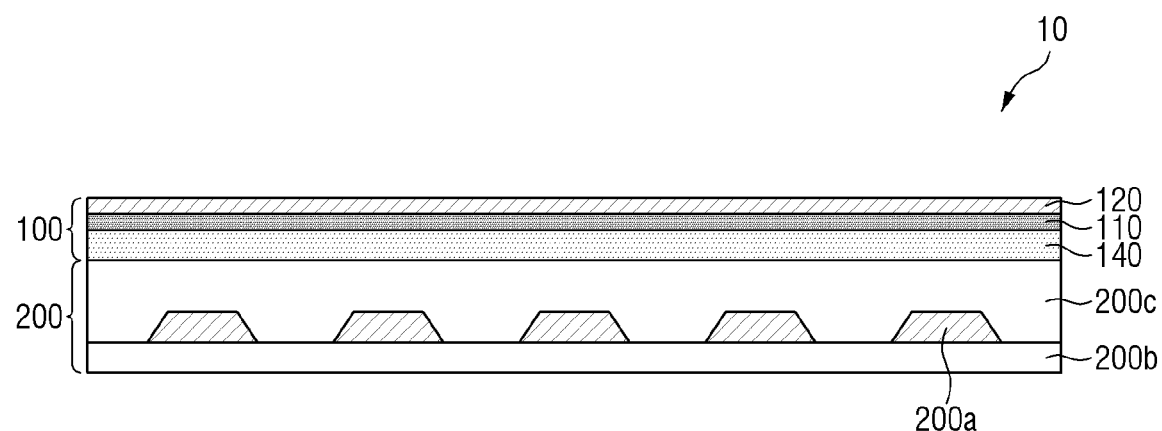
FIG. 4 is a cross-sectional view illustrating a panel lower sheet according to an exemplary embodiment.

FIG. 4 is a cross-sectional view illustrating a panel lower sheet according to an exemplary embodiment. For convenience of description, an overall flat panel lower sheet is shown in FIG. 4. It will be understood that when a panel lower sheet having a flat shape is attached to a display panel having a flat shape, the flat shape is maintained, but when the panel lower sheet is attached to a bent display panel, the panel lower sheet is bent together with the bent display panel and thus is divided into a flat portion and a bending portion.

Referring to FIG. 4, an exemplary embodiment of a panel lower sheet 10 includes a cover panel portion 100 and a wiring pattern portion 200 disposed below the cover panel portion 100.

The cover panel portion 100 includes a cover substrate 110, a first light absorption layer 120 disposed on an upper surface of the cover substrate 110, and a first interlayer coupling layer 140 disposed on a lower surface of the cover substrate 110.

The cover substrate 110 may include at least one selected from polyethylene terephthalate ("PET"), polyimide ("PI"), polycarbonate ("PC"), polyethylene ("PE"), polypropylene ("PP"), polysulfone ("PSF"), polymethylmethacrylate ("PMMA"), triacetyl cellulose ("TAC"), cycloolefin polymer ("COP"), and the like.

The first light absorption layer 120 is disposed on the upper surface of the cover substrate 110. The first light absorption layer 120 may be disposed directly on the upper surface of the cover substrate 110. The first light absorption layer 120 is disposed to completely cover a wiring pattern 200a thereunder. The first light absorption layer 120 may be disposed on the entire upper surface of the cover substrate 110.

The first light absorption layer 120 prevents transmission of light to prevent the wiring pattern 200a of the wiring pattern portion 200 thereunder from being visible from above. The first light absorption layer 120 may include a light absorption material such as a black pigment or a dye. The first light absorption layer 120 may include a black ink. The first light absorption layer 120 may be provided or formed on the upper surface of the cover substrate 110 through a coating method or a printing method. The first light absorption layer 120 will be described in greater detail below.

The first interlayer coupling layer 140 is disposed on the lower surface of the cover substrate 110. The first interlayer coupling layer 140 couples the cover substrate 110 and the wiring pattern portion 200 to each other. In such an embodiment, the first interlayer coupling layer 140 functions to couple the cover panel portion 100 and the wiring pattern portion 200. In such an embodiment, the first interlayer coupling layer 140 is included in the cover panel portion 100, but not being limited thereto. Alternatively, the first interlayer coupling layer 140 may be included in the wiring pattern portion 200 or may be defined as a separate member.

The first interlayer coupling layer 140 may include a polymer material such as a silicone-based polymer, a urethane-based polymer, a silicone-urethane ("SU") hybrid polymer, an acrylic-based polymer, an isocyanate-based polymer, a polyvinyl alcohol-based polymer, a gelatin-based polymer, a vinyl-based polymer, a latex-based polymer, a polyester-based polymer, an aqueous polyester based-polymer, etc. The wiring pattern portion 200 may include a wiring pattern 200a and insulating layers 200b and 200c surrounding upper and lower portions of the wiring pattern 200a. In an exemplary embodiment, as shown in FIG. 4, the wiring pattern portion 200 may include a first insulating layer 200b, the wiring pattern 200a disposed on an upper surface of the first insulating layer 200b, and a second insulating layer 200c covering an upper surface of the wiring pattern 200a. The wiring pattern 200a covers one portion of the upper surface of the first insulating layer 200b and exposes a remaining portion of the upper surface of the first insulating layer 200b. The second insulating layer 200c may be disposed not only on upper and side surfaces of each wiring pattern 200a but also on the exposed upper surface of the first insulating layer 200b.

The wiring pattern 200a may include a metal material such as copper, silver, nickel, tungsten, or the like. The wiring pattern 200a may be composed of a single layer or a plurality of laminated layers. In an exemplary embodiment, the wiring pattern 200a may be a double layer including a lower copper layer and an upper copper layer. The wiring pattern 200a may be at least one of a wire configured to transmit a signal, an electrode, a floating wire, and a floating electrode.

Each of the first and second insulating layers 200b and 200c may include or be made of an organic insulating material, an inorganic insulating material, an organic insulating material, or a binder such as an adhesive material, a glue material, or the like.

In an exemplary embodiment, the wiring pattern portion 200 may be a digitizer. The digitizer is a type of input device that receives position information indicated by a user on a screen unlike an input device such as a keyboard or a mouse. In one exemplary embodiment, for example, the digitizer detects movement of a stylus pen and converts the movement into a digital signal. The digitizer may be provided in a form of a film or panel. An exemplary embodiment, where the wiring pattern portion 200 is the digitizer will be described in greater detail below with reference to FIGS. 5 and 6. However, the disclosure is not limited thereto, and alternatively various members including a wiring pattern, such as a printed circuit board and a flexible printed circuit board, may be defined by the wiring pattern portion 200.

All of the cover substrate 110, the first light absorption layer 120, and the first interlayer coupling layer 140 of the cover panel portion 100 and the first insulating layer 200b and the second insulating layer 200c of the wiring pattern portion 200 may overlap each other and side surfaces thereof may be aligned with each other. Each of the side surfaces may be a cut surface. In one exemplary embodiment, for example, where a mother panel lower sheet is formed and then cut to obtain a plurality of individual panel lower sheets 10, all of the above-described side surfaces correspond to cut surfaces.

In a case where the wiring pattern 200a includes or is made of a material such as a metal, due to high reflectivity thereof, the wiring pattern 200a reflects light incident from above well. When the reflected light is emitted toward a display screen, a user is likely to perceive a shape of the wiring pattern 200a. Thus, the reflected light may adversely affect image quality of the display device 70. The first light absorption layer 120 prevents the reflected light from being emitted toward the screen. The first light absorption layer 120 prevents light from being primarily transmitted downward and prevents reflected light from being secondarily transmitted upward.

The first light absorption layer 120 may have a sufficient or effective thickness to prevent a pattern of the wiring pattern 200a from being visible. When a thickness of the first light absorption layer 120 is greater than or equal to about 2 micrometers (μm), the first light absorption layer 120 may have an optical density ("OD") of about 3.4 or greater. Accordingly, the reflectivity of the wiring pattern 200a in the direction of the screen may be sufficiently lowered, thereby preventing a reflection phenomenon of the wiring pattern 200a. When the thickness of the first light absorption layer 120 is greater than or equal to about 4 μm, the first light absorption layer 120 may have an OD of about 5 or greater. Accordingly, even when a stepped portion of the wiring pattern 200a causes a surface unevenness of an upper layer thereof to some extent, the reflection phenomenon of the wiring pattern 200a may be prevented.

As the thickness of the first light absorption layer 120 is increased, the optical density is further increased. In an exemplary embodiment, in view of efficiency of coating and printing processes, durability, thinning of the display device, and the like, the thickness of the first light absorption layer 120 may be less than or equal to 10 μm.

Hereinafter, an exemplary embodiment, where the wiring pattern portion 200 is the digitizer will be described in detail.

Figure 5A:
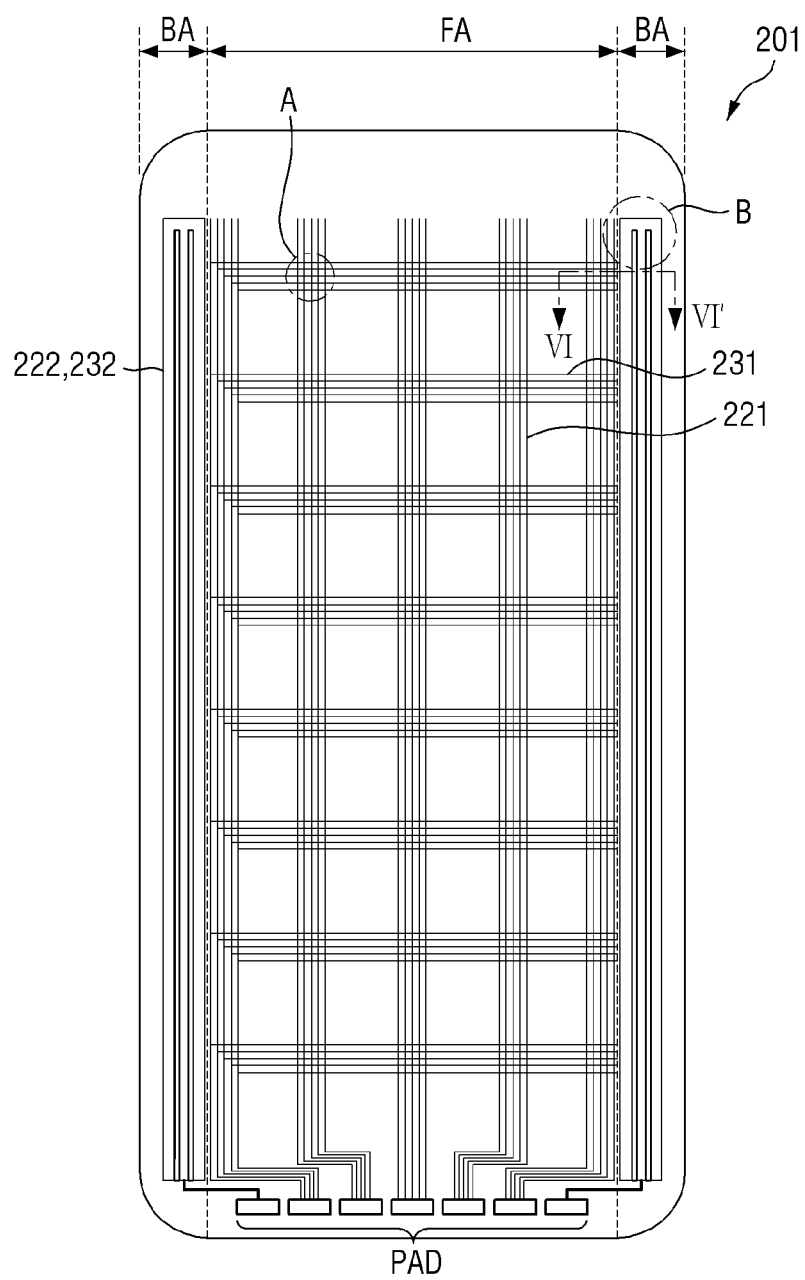
FIG. 5A is a plan view illustrating a digitizer according to an exemplary embodiment.
Figure 5B:
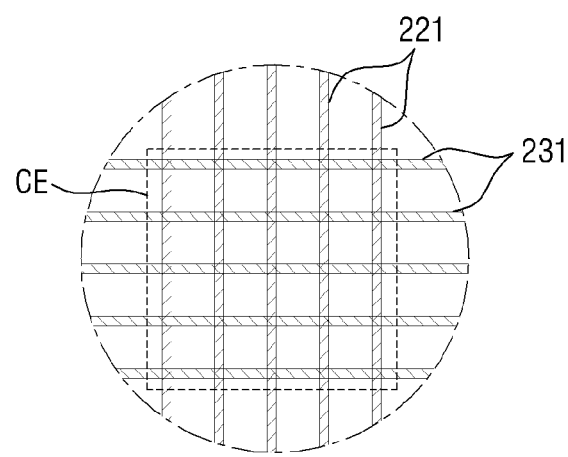
FIG. 5B is an enlarged view of the encircled portion A in FIG. 5A.
Figure 5C:
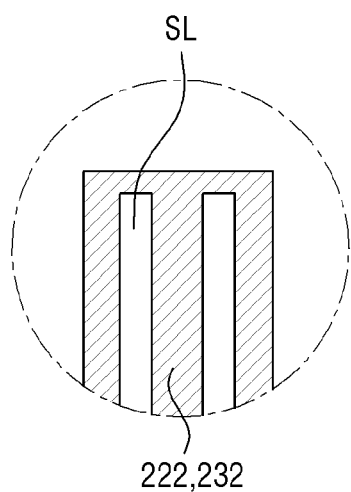
FIG. 5C is an enlarged view of the encircled portion B in FIG. 5A
Figure 6:
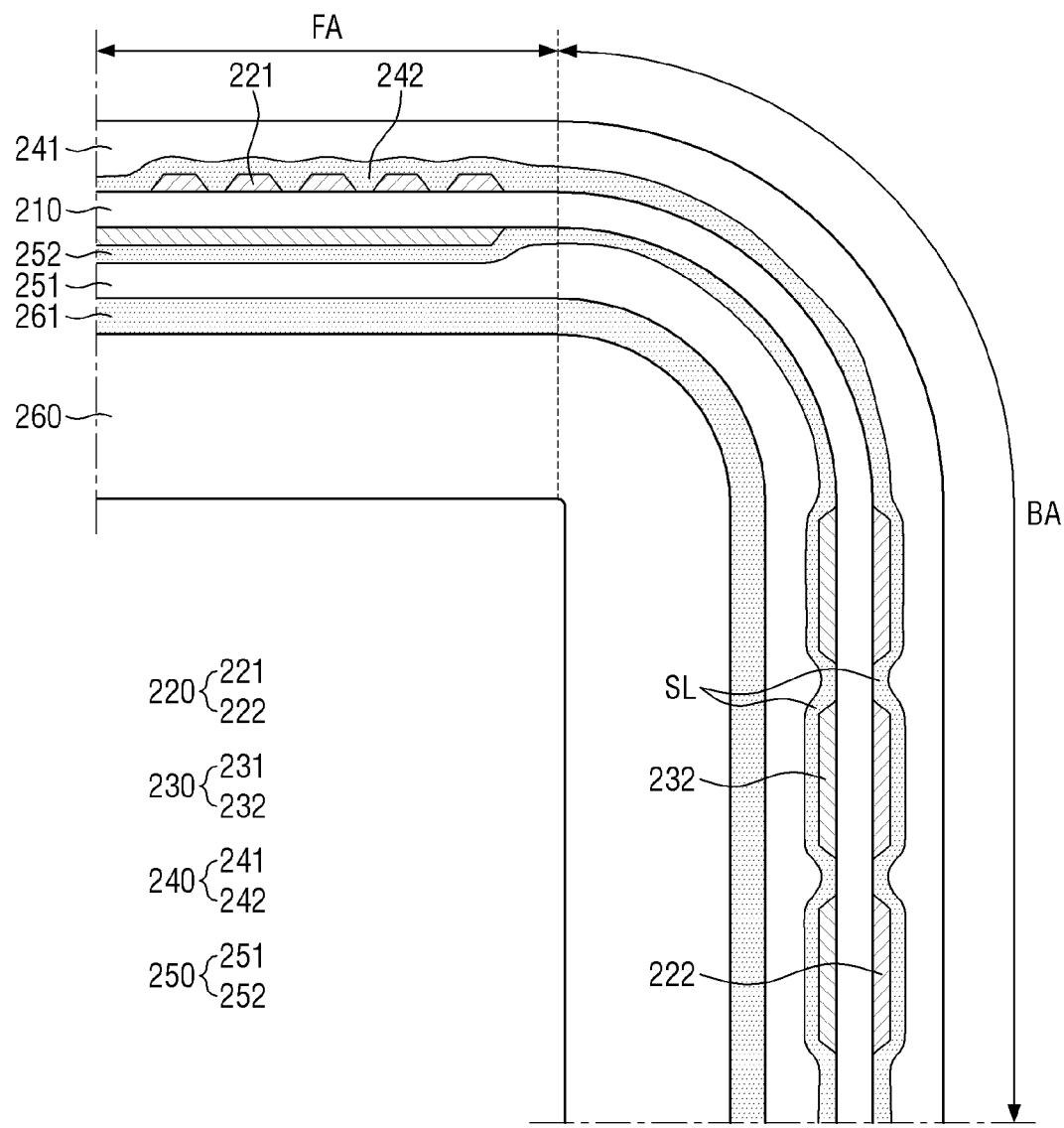
FIG. 6 is a cross-sectional view taken along line VI-VI' of FIG. 5.

FIG. 5A is a plan view illustrating a digitizer according to an exemplary embodiment. FIG. 5B is an enlarged view of the encircled portion A in FIG. 5A. FIG. 5C is an enlarged view of the encircled portion B in FIG. 5A. FIG. 6 is a cross-sectional view taken along line VI-VI' of FIG. 5.

Referring to FIGS. 5A to 6, a digitizer 201 includes a substrate layer 210, a first wiring layer 220 disposed on an upper surface of the substrate layer 210, and a second wiring layer 230 disposed on a lower surface of the substrate layer 210. The digitizer 201 may further include a first coverlay 240 configured to cover an upper side of the first wiring layer 220, a second coverlay 250 configured to cover a lower side of the second wiring layer 230, a signal shielding sheet 260, and a fifth interlayer coupling layer 261 interposed between the signal shielding sheet 260 and the second coverlay 250. In an exemplary embodiment, the first coverlay 240 may include a first layer 241 and a second layer 242, and the second coverlay 250 may include a first layer 251 and a second layer 252. In an exemplary embodiment, an upper surface of the first coverlay 240 may be coupled to a lower surface of a first interlayer coupling layer 140 shown in FIG. 4, and a lower surface of the signal shielding sheet 260 may be coupled to a film coupling layer 320 shown in FIG. 8.

The substrate layer 210 may be a substrate on which wiring layers 220 and 230 may be provided or formed. The substrate layer 210 may include or be made of an insulating material. The substrate layer 210 may include or be made of an inorganic material such as a glass, or may include or be made of an organic material to implement flexible characteristics. In one exemplary embodiment, for example, the substrate layer 210 may include or be made of at least one selected from PI, PET, PC, PE, PP, PSF, PMMA, TAC, a COP, and the like. In one exemplary embodiment, for example, the substrate layer 210 may include a PI.

The first wiring layer 220 and the second wiring layer 230 are disposed on the upper surface and the lower surface of the substrate layer 210, respectively. The first wiring layer 220 and the second wiring layer 230 may be disposed or formed directly on a surface of the substrate layer 210. The first wiring layer 220 and the second wiring layer 230 may include or be made of a metal material such as copper, silver, nickel, tungsten, or the like. In an embodiment, as shown in FIG. 6, the first wiring layer 220 and the second wiring layer 230 may be formed as a single film, but not being limited thereto. Alternatively, the first wiring layer 220 and the second wiring layer 230 may be formed as a plurality of laminated films. In one exemplary embodiment, for example, the first wiring layer 220 and the second wiring layer 230 may include a first copper film and a second copper film, which are stacked on one another.

The first wiring layer 220 includes a plurality of first wiring patterns 221 and a first ground wiring 222. The second wiring layer 230 includes a plurality of second wiring patterns 231 and a second ground wiring 232.

The plurality of first wiring patterns 221 may extend in a first direction, for example, a long side direction. The plurality of second wiring patterns 231 may extend in a second direction, for example, a short side direction intersecting with the first direction. In an exemplary embodiment, the first and second wiring patterns 221 and 231 may be mostly disposed on a flat portion FA and may not be disposed on a bending portion BA. Alternatively, some of the first and second wiring patterns 221 and 231 may be disposed in the bending portion BA.

The plurality of first wiring patterns 221 and the plurality of second wiring patterns 231 may collectively define wiring pattern groups. In one exemplary embodiment, for example, as shown in FIG. 5B, five wiring patterns of the of first wiring patterns 221 and five wiring patterns of the second wiring patterns 231 may form one wiring pattern group. However, the disclosure is not limited thereto, and various numbers of wiring patterns may collectively define or form a wiring pattern group.

In an exemplary embodiment, as shown in FIG. 5A, a separation distance between a wiring pattern group and a wiring pattern group may be greater than a separation distance between the wiring patterns 221 and 231 in the wiring pattern groups. In an exemplary embodiment, as described above, when a separation distance in a specific region is large, a stepped portion of a corresponding region may be greatly reflected on an upper portion thereof, and thus, a pattern may be visible. In such an embodiment, the first light absorption layer 122 and/or the second light absorption layer 123 are disposed on the first and second wiring patterns 221 and 231, such that a pattern may be prevented from being visible as described above.

A region in which the wiring pattern group of the first wiring pattern 221 and the wiring pattern group of the second wiring pattern 231 intersect with each other may become a coordinate electrode portion CE which is a basic unit for position recognition.

Each of the first ground wiring 222 and the second ground wiring 232 is disposed in the bending portion BA. The first ground wiring 222 and the second ground wiring 232 may extend in the long side direction in the same manner as the first wiring pattern 221. The first ground wiring 222 and the second ground wiring 232 substantially overlap each other. The first ground wiring 222 and the second ground wiring 232 are illustrated in the drawing as completely overlapping each other and appearing to completely overlap when viewed from above, but the disclosure is not limited thereto.

Each of first ground wiring 222 and the second ground wiring 232 has a slit SL. The slit SL may extend in the same direction as a bending direction. In an exemplary embodiment, the first and second ground wirings 222 and 232 are divided into sub-wirings with the slit SL therebetween but may be connected at ends thereof. In such an embodiment, the slit SL may be surrounded by the first and second ground wirings 222 and 232. However, the disclosure is not limited thereto, and alternatively, the slit SL may extend to the ends of the first and second ground wirings 222 and 232 to divide the first and second ground wirings 222 and 232 into the sub-wirings at the ends. In an exemplary embodiment, as shown in FIG. 5C, two slits SL are defined in the first ground wiring 222 and the second ground wiring 232 to divide the first ground wiring 222 and the second ground wiring 232 into three sub-wirings, but the number of the slits SL may be variously modified to be one or three or more, for example. The slit SL may function to reduce bending stress.

In an exemplary embodiment, the first and second ground wirings 222 and 232 have a relatively wide width. In one exemplary embodiment, for example, a width of the first and second ground wirings 222 and 232 may be greater than a width of the first and second wiring patterns 221 and 231. When the first and second ground wirings 222 and 232 disposed in the bending portion BA are wide, the first and second ground wirings 222 and 232 display panel 20 receive great stress at corresponding portions thereof when being attached to the display panel 20 to be bent together with the display panel 20. In one exemplary embodiment, for example, when the first and second ground wirings 222 and 232 include or are made of copper, due to great resistance to bending, the panel lower sheet may not be appropriately attached, or even after the panel lower sheet is attached, a bonding force may be likely to be weakened.

In an exemplary embodiment, as described above, the slits SL are formed in the first and second ground wirings 222 and 232, in terms of bending stress, it is possible to obtain an effect of reducing the widths of the first and second ground wirings 222 and 232. In an exemplary embodiment, as shown in FIG. 6, flexibility is secured at the slit SL in which there is no wiring material, and thus, bending may be appropriately performed.

In such an embodiment, the slit SL may also positively act to prevent pattern visibility. If the first and second ground wirings 222 and 232 are formed as a box wiring which does not include the slit SL, reflection of light may further occur due to a wide area thereof, and thus, a corresponding region may be easily visible from an outside. In an exemplary embodiment, the box wiring is divided through the slit SL, such that reflectivity may be decreased, thereby a pattern may be less visible from the outside.

A pad portion PAD is provided near one side of the substrate layer 210. An external device such as a printed circuit board ("PCB"), a flexible printed circuit board ("FPC"), or the like is connected to the pad portion PAD. The first wiring pattern 221 and the second wiring pattern 231 may be connected to the pad portion PAD to communicate signals with the external device.

The pad portion PAD may include the first wiring layer 220 and/or the second wiring layer 230. In an exemplary embodiment, where the pad portion PAD includes both of the first wiring layer 220 and the second wiring layer 230, the PCB or FPC may be connected to each pad portion PAD, and the first wiring pattern 221 and the first ground wiring 222 may be connected to the pad portion PAD corresponding to the first wiring layer 220, and the second wiring pattern 231 and the second ground wiring 232 may be connected to the pad portion PAD corresponding to the second wiring layer 230.

Hereinafter, an exemplary method of manufacturing a display device including a panel lower sheet substrate using the panel lower sheet 10 will be described.

Figure 7:
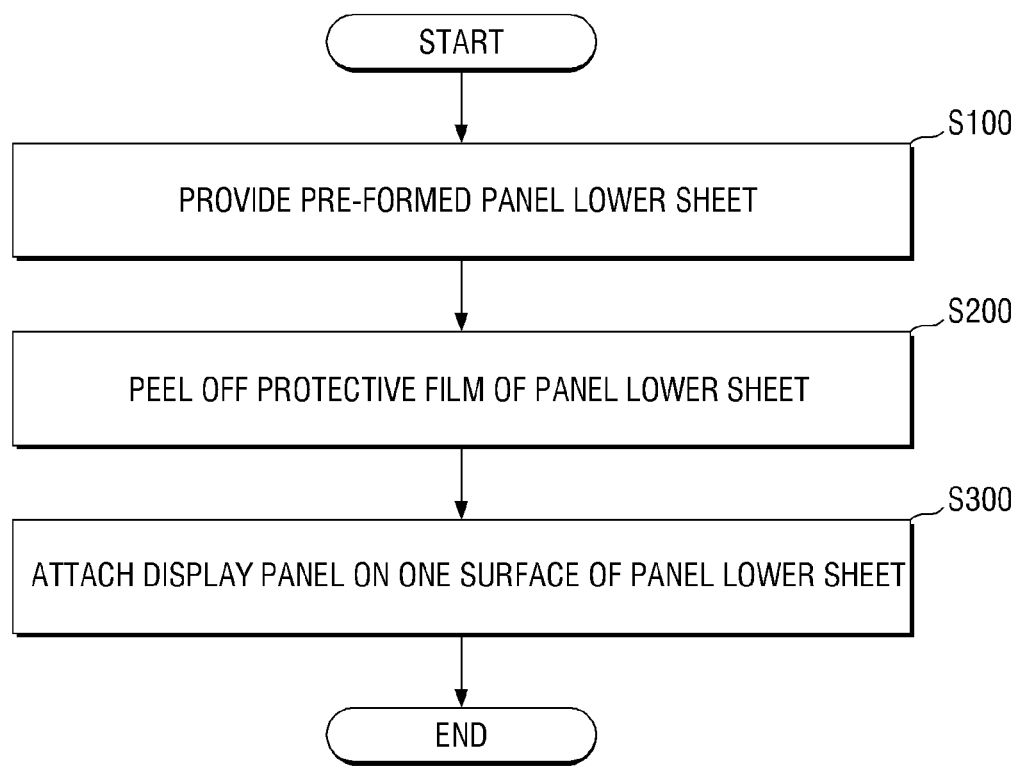
FIG. 7 is a flowchart of a method of manufacturing a display device according to an exemplary embodiment.
Figure 8:
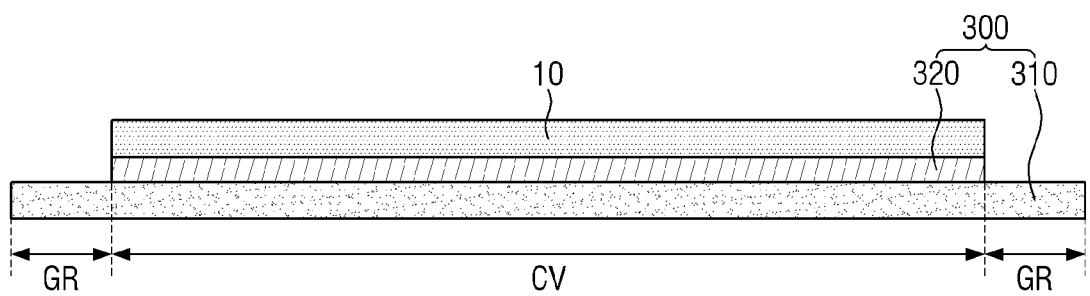
FIG. 8 is a side view illustrating a state in which a protective film is attached to a panel lower sheet.
Figure 9A:
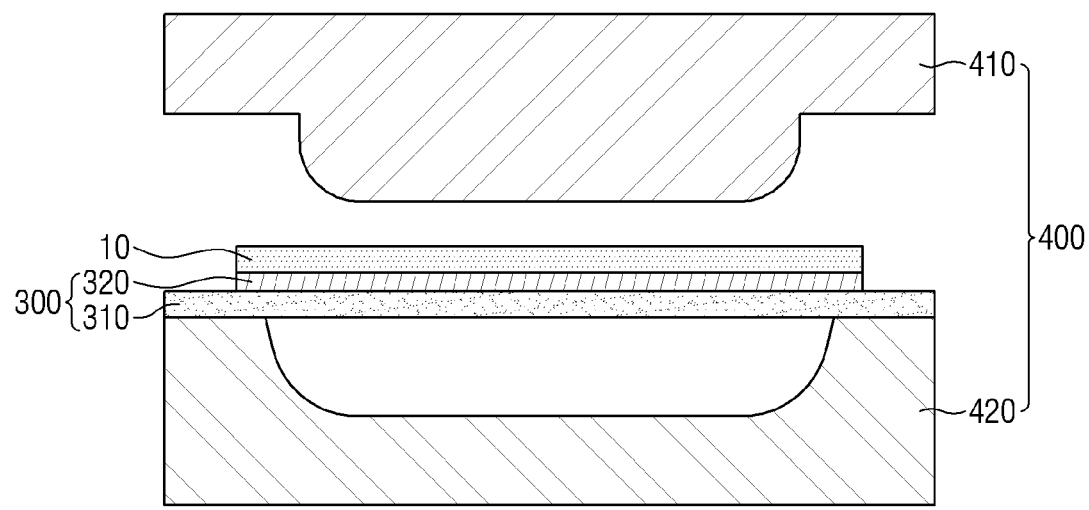
FIGS. 9A and 9B are views illustrating operations of pre-forming a panel lower sheet and a protective film.
Figure 9B:
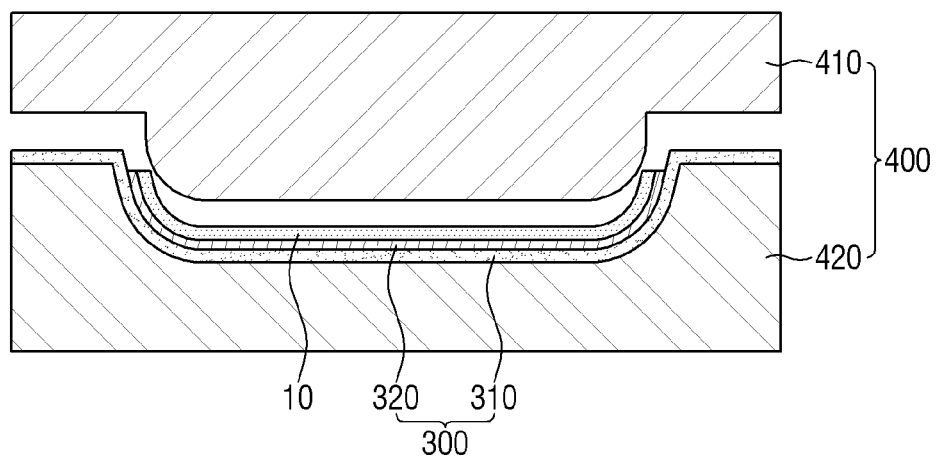
Figure 10:
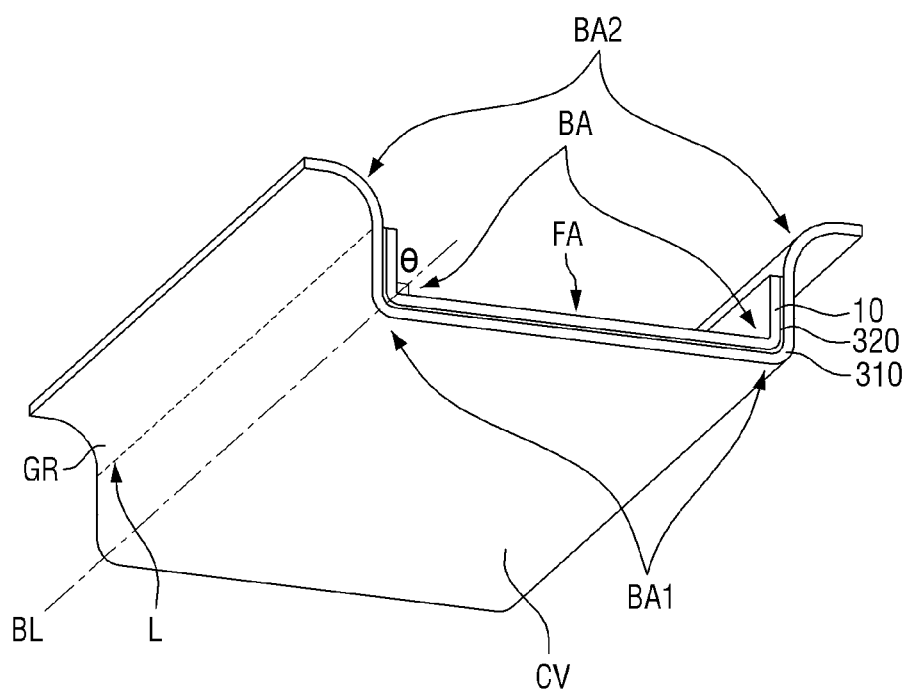
FIG. 10 is a perspective view illustrating a state in which the panel lower sheet and the protective film are pre-formed.
Figure 11:
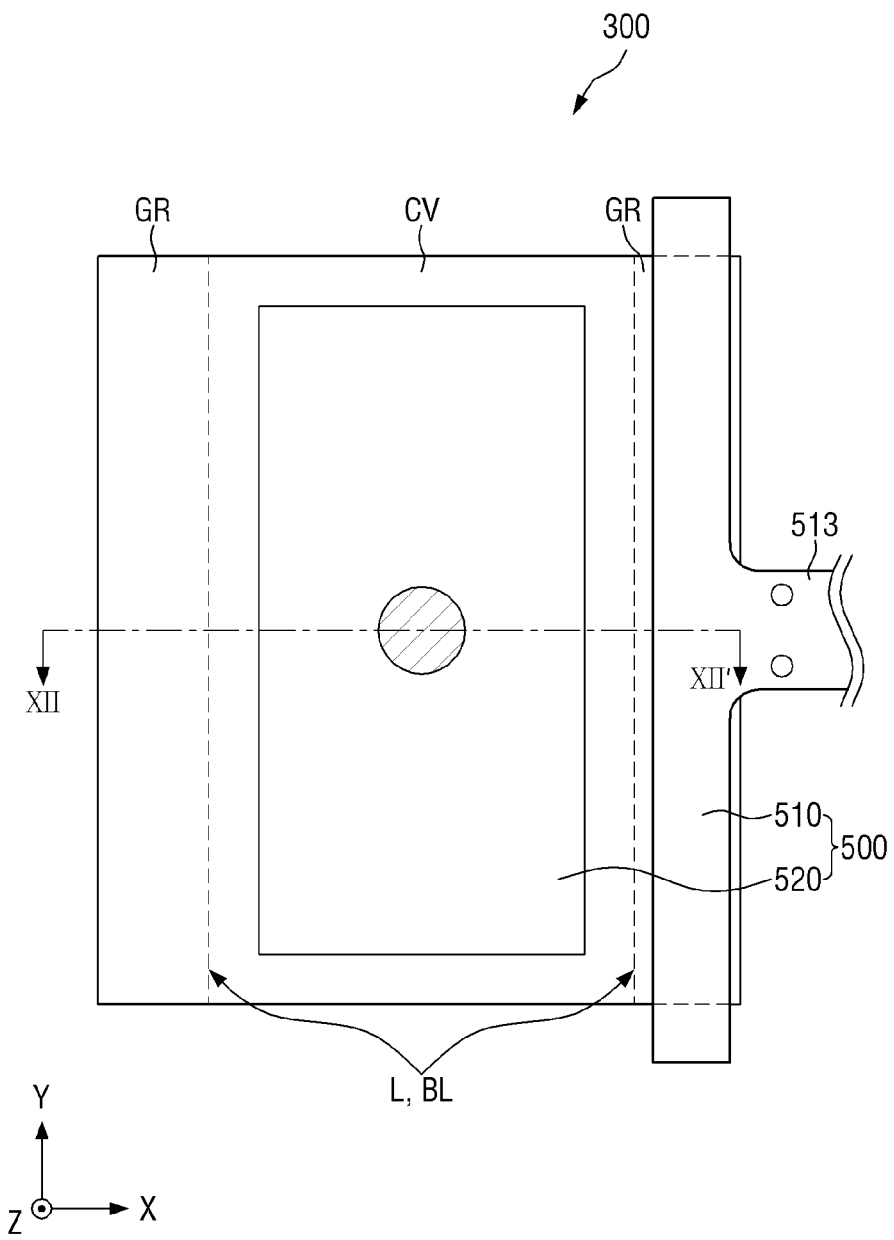
FIG. 11 is a plan view illustrating a state in which a clamping device grips the protective film.
Figure 12:
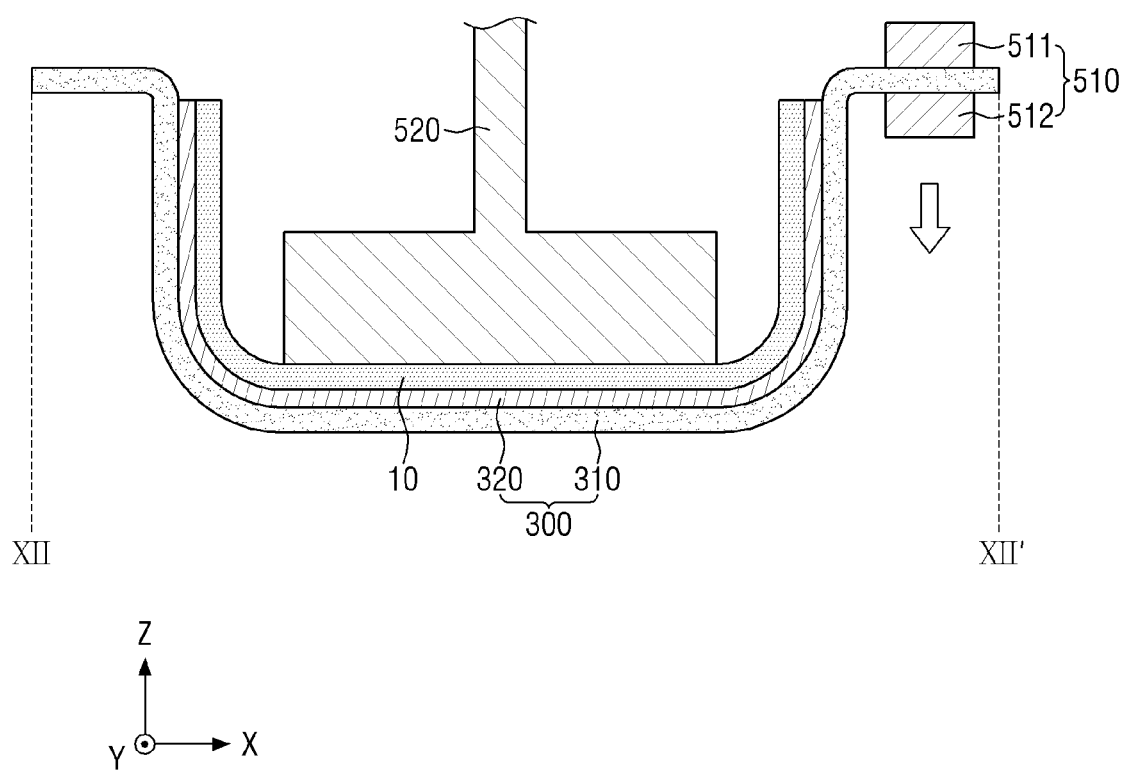
FIGS. 12 and 13 are sectional views illustrating a process of peeling off the protective film.
Figure 13:
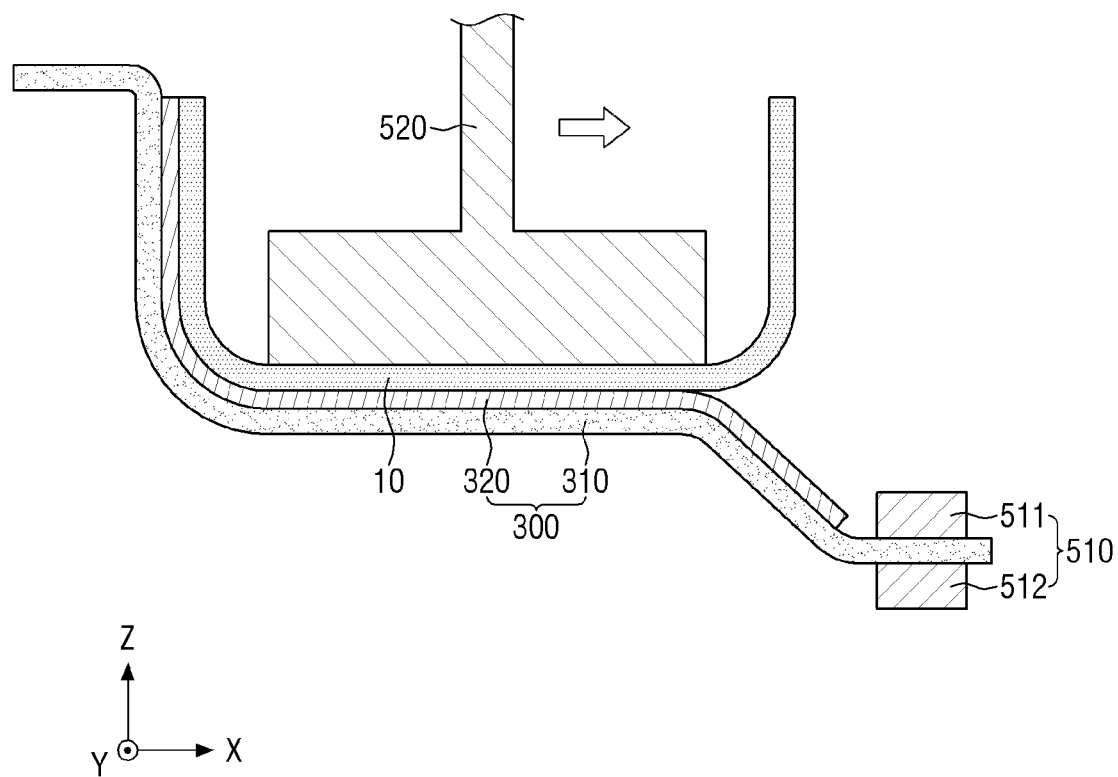

FIG. 7 is a flowchart of a method of manufacturing a display device according to an exemplary embodiment. FIG. 8 is a side view illustrating a state in which a protective film is attached to a panel lower sheet. FIGS. 9A and 9B are views illustrating operations of pre-forming a panel lower sheet and a protective film. FIG. 10 is a perspective view illustrating a state in which the panel lower sheet and the protective film are pre-formed. FIG. 11 is a plan view illustrating a state in which a clamping device grips the protective film. FIGS. 12 and 13 are sectional views illustrating a process of peeling off the protective film.

Referring to FIGS. 7 to 13, in an embodiment of a method of manufacturing a display device, a pre-formed panel lower sheet 10 is provided (S100).

Referring to FIG. 8, which is a cross-sectional view illustrating a process of the operation S100, the panel lower sheet 10 and a protective film 300 may be provided. The protective film 300 includes a film layer 310 and a film coupling layer 320. The film layer 310 covers one surface of the panel lower sheet 10. The film layer 310 may include a cover portion CV overlapping the panel lower sheet 10 and at least one grip portion GR protruding outward from the cover portion CV.

The cover portion CV of the film layer 310 may have a substantially the same or similar shape to the panel lower sheet 10 and may be disposed to overlap the panel lower sheet 10 and to substantially cover the panel lower sheet 10. The cover portion CV may have a same shape as the panel lower sheet 10 and thus completely cover one surface of the panel lower sheet 10, or a size of the cover portion CV may be slightly smaller, and thus, a portion of an edge of the panel lower sheet 10 may be exposed.

The grip portions GR of the film layer 310 are connected to both side surfaces of the cover portion CV and extend outward from the both side surfaces. The grip portion GR may protrude outward with respect to the panel lower sheet 10 when viewed from above. in an exemplary embodiment, the grip portion GR does not overlap the panel lower sheet 10 when viewed from above or a top plan view. Since the grip portion GR protrudes from the panel lower sheet 10, when the film layer 310 are peeled off, the protective film 300 may be easily gripped through the grip portion GR. Accordingly, a process of peeling off the protective film 300 may be performed effectively or rapidly. Alternatively, the grip portion GR may be disposed at only one side with respect to the cover portion CV, and a length of the grip portion GR extending from the cover portion CV may be various modified according to a gripper GP to be described below.

The film layer 310 may include or be made of at least one selected from among PET, PI, PC, PE, PP, PSF, PMMA, TAC, a COP, and the like.

The film coupling layer 320 is disposed on one surface of the cover portion CV of the film layer 310 to couple the film layer 310 to one surface of the panel lower sheet 10. In an exemplary embodiment, the film layer 310 is attached to one surface of the panel lower sheet 10 through the film coupling layer 320. The film coupling layer 320 may be disposed on an entire surface of the cover portion CV, but the disclosure is not limited thereto. The film coupling layer 320 may be partially disposed to an extent sufficient to couple the film layer 310 and the panel lower sheet 10. The film coupling layer 320 may not be disposed on the grip portion GR which is desired not to be coupled to the panel lower sheet 10.

A bonding force of the film coupling layer 320 to the panel lower sheet 10 may be sufficient or effective as long as the film layer 310 is attached to the panel lower sheet 10 without being separated from the panel lower sheet 10 during storage or transportation. When the protective film 300 is peeled off, the film coupling layer 320 may be separated from the panel lower sheet 10 in a state of being attached to the film layer 310 and may not remain on a surface of the panel lower sheet 10. Accordingly, in such an embodiment, the bonding force of the film coupling layer 320 to the panel lower sheet 10 may be less than the bonding force of the film coupling layer 320 to the film layer 310.

The film coupling layer 320 may be formed or function as a low adhesive layer. In one exemplary embodiment, for example, the film coupling layer 320 may include or be made of an acrylic-based material, a silicon-based material, or a urethane-based material.

Referring to FIGS. 9A and 9B, the panel lower sheet 10 to which the protective film 300 is attached may be pre-formed to have a set shape. Here, the "set shape" means a shape corresponding to a shape of a product to be transferred, i.e., an inner shape of the display panel 20 (see FIG. 2).

Referring to FIG. 9A, in an exemplary embodiment, a pre-forming device 400, which is driven to vertically press the panel lower sheet 10, to which the protective film 300 is attached, may be used in the operation of pre-forming the panel lower sheet 10 to which the protective film 300 is attached. Here, the pre-forming device 400 may include a pre-forming upper body 410 and a pre-forming lower body 420. The upper body 410 and the lower body 420 include heating devices capable of applying heat to the panel lower sheet 10 to which the protective film 300 is attached.

In an exemplary embodiment, the pre-forming lower body 420 may be disposed below the panel lower sheet 10 to which the protective film 300 is attached and may have a groove corresponding to an inner sectional shape of the panel lower sheet 10 (see FIG. 2). In such an embodiment, the pre-forming upper body 410 may be disposed on the panel lower sheet 10 to which the protective film 300 is attached and may include a protrusion protruding toward the groove.

In such an embodiment, as shown in FIG. 9B, the pre-forming upper body 410 presses an upper surface of the panel lower sheet 10 to which the protective film 300 is attached, and thus, the panel lower sheet 10 to which the protective film 300 is attached may be pre-formed to have the set shape between the pre-forming upper body 410 and the pre-forming lower body 420.

When such a pre-forming operation is performed, a separate guide pin (not shown) or the like may be used to fix a position of the panel lower sheet 10 to which the protective film 300 is attached.

Referring to FIG. 10, the protective film 300 pre-formed together with the panel lower sheet 10 may include a plurality of bending regions. In one exemplary embodiment, for example, the panel lower sheet 10 may have a rectangular shape when viewed from above. The panel lower sheet 10 may have both long sides and both short sides. The panel lower sheet 10 may include bending portions BA at both long sides thereof. As shown in FIG. 10, a bending angle θ of the bending portion BA may be about 90° but is not limited thereto. The bending angle θ may be an obtuse angle such as about 120°. In an exemplary embodiment, the bending angle θ may be in a range of about 90° to about 120°. The protective film 300 may form a first bending region BA1 along a shape of the bending portion BA of the panel lower sheet 10 and may also form a second bending region BA2 near a boundary line L between the cover portion CV and the grip portion GR.

Then, the protective film 300 of the pre-formed panel lower sheet 10 is peeled off to expose one surface of the panel lower sheet 10 (S200). FIGS. 11 to 13 are schematic views illustrating a process of peeling off the protective film 300 from the pre-formed panel lower sheet 10.

Referring to FIGS. 11 to 13, when a peeling robot 500 grips the grip portion GR to peel the protective film 300 off, the protective film 300 is separated from one surface of the panel lower sheet 10.

in an exemplary embodiment, the pre-formed panel lower sheet 10 is placed on a stage (not shown). The pre-formed panel lower sheet 10 may be placed on the stage using the robot 500 or the like.

According to an exemplary embodiment, a vacuum suction device 520 may be placed on the upper surface of the pre-formed panel lower sheet 10. The vacuum suction device 520 may support and fix the pre-formed panel lower sheet 10. The vacuum suction device 520 may maintain a degree of vacuum (or suction pressure) such that a shape of the pre-formed panel lower sheet 10 is not deformed. In such an embodiment, the vacuum suction device 520 may transfer the adsorbed panel lower sheet 10 from one point to the other point.

Then, the clamping device 510 may grip the grip portion GR of the pre-formed panel lower sheet 10 fixed by the vacuum suction device 520. In an exemplary embodiment, as shown in FIGS. 11 and 12, the clamping device 510 may include an upper plate 511, a lower plate 512 opposite to the upper plate 511, and a transmission member 513 configured to adjust a distance between the upper plate 511 and the lower plate 512. In such an embodiment, the clamping device 510 may move the gripped protective film 300 from one point to another point.

One side of the clamping device 510 may be disposed parallel to the cover portion CV of the protective film 300 and the boundary line L between the cover portion CV and the grip portion GR. A length of the clamping device 510 in a Y-axis direction may be greater than a length of a long side of the protective film 300, which extends in the Y-axis direction. Therefore, when the clamping device 510 grips the protective film 300, the clamping device 510 may have a gripping force which is uniformly applied to an entire region of the protective film 300.

The clamping device 510 may move in a direction opposite to a Z-axis direction in a state in which the clamping device 510 grips the grip portion GR of the protective film 300. In an exemplary embodiment, as described above, the bonding force of the film coupling layer 320 to the panel lower sheet 10 may be less than the bonding force of the film coupling layer 320 to the film layer 310. As a result, as the clamping device 510 moves in the direction opposite to the Z-axis direction, peeling off the protective film 300 from the panel lower sheet 10 may be started. A movement distance of the clamping device 510 in the Z-axis direction is sufficient as long as the clamping device 510 does not obstruct a movement path of the vacuum suction device 520 in the X-axis direction.

Then, the vacuum suction device 520 may move in the X-axis direction while supporting and fixing the panel lower sheet 10. In such an embodiment, the X-axis direction may be a direction orthogonal to the boundary line L between the cover portion CV and the grip portion GR of the protective film 300. Since one end of the protective film 300 is fixed by the clamping device 510, while the vacuum suction device 520 moves in the X-axis direction, the protective film 300 may be continuously peeled off from the panel lower sheet 10. A movement distance of the vacuum suction device 520 in the X-axis direction is sufficient as long as the protective film 300 is completely peeled off from the panel lower sheet 10.

A release force generated when the protective film 300 is peeled off from the panel lower sheet 10 includes normal stress acting in a direction perpendicular to a surface and shear stress acting parallel to a surface as if pushing the surface.

According to an exemplary embodiment of the method of peeling off the protective film, a phenomenon that the protective film 300 is not peeled off from the pre-formed panel lower sheet 10 may be reduced, thereby reducing a probability that the panel lower sheet 10 is damaged. When the clamping device 510 grips the long side of the protective film 300, one side of the clamping device 510 may be parallel to the boundary line L between the cover portion CV and the grip portion GR, and a movement direction of the vacuum suction device 520 may be perpendicular to the boundary line L between the cover portion CV and the grip portion GR. Therefore, most of a force generated when the protective film 300 is peeled off from the panel lower sheet 10 is normal stress, and shear stress is barely generated. Accordingly, in such an embodiment, since a peeling direction is perpendicular to a bending line BL of the protective film 300, normal stress may be generated in all regions of the flat portion FA and the bending portion BA of the protective film 300.

Although not shown, when the grip portion GR is formed or defined at one side of the pre-formed panel lower sheet 10 extending in the X-axis direction, one side of the clamping device 510 may be perpendicular to the boundary line L between the cover portion CV and the grip portion GR of the protective film 300. In such a case, the movement direction of the vacuum suction device 520 may be parallel to the boundary line L between the cover portion CV and the grip portion GR of the protective film 300. Accordingly, when the protective film 300 is peeled off from the panel lower sheet 10, a considerable amount of shear stress as well as vertical stress may be generated. That is, since the peeling direction is parallel to the bending line BL of the protective film 300, vertical stress may be generated in the flat portion FA of the protective film 300, and vertical stress as well as shear stress may be generated in the bending portion BA of the protective film 300. When the protective film 300 is broken during peeling the protective film 300 off, an automation process is stopped, and thus, a production yield may be lowered. In addition, even when the protective film 300 is not broken during peeling off the protective film 300, when a release force generated in the bending portion BA of the protective film 300 is strong, the protective film 300 may not be peeled off, and the panel lower sheet 10 may be bent and damaged.

Then, a display panel is attached on one surface of the panel lower sheet 10 (S300). The display panel 20 may be an organic light-emitting display panel, a liquid crystal display panel, or the like. The display panel 20 may be attached to one surface of the panel lower sheet 10 through an OCA or an OCR.

Hereinafter, an alternative exemplary embodiment will be described. Hereinafter, descriptions of a same or like configuration of such alternative exemplary embodiments as that of the exemplary embodiments described above will be omitted or simplified, and differences will be mainly described.

Figure 14A:
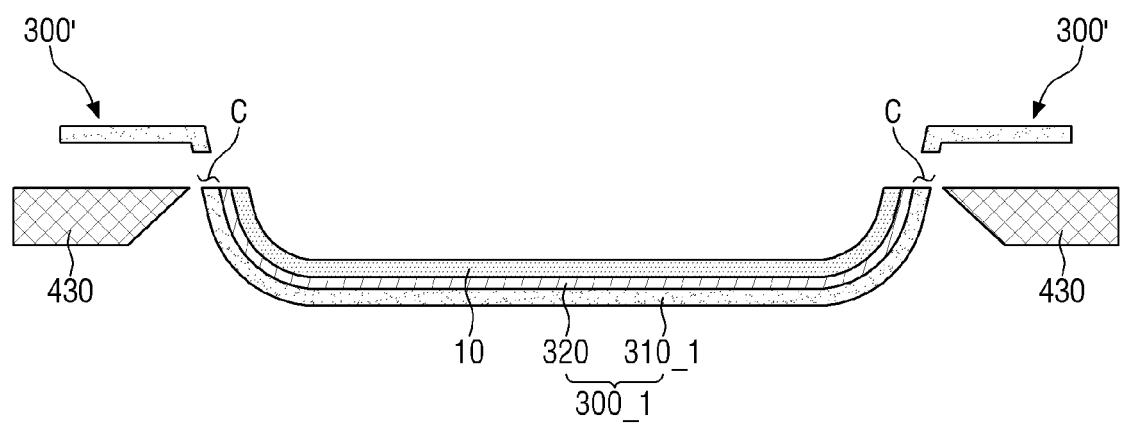
FIGS. 14A and 14B are views illustrating a side cutting process according to an alternative exemplary embodiment.
Figure 14B:
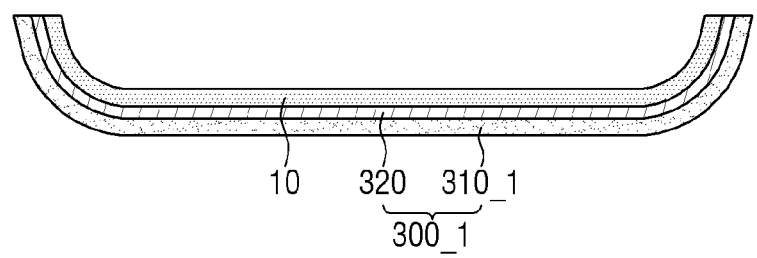
Figure 15:
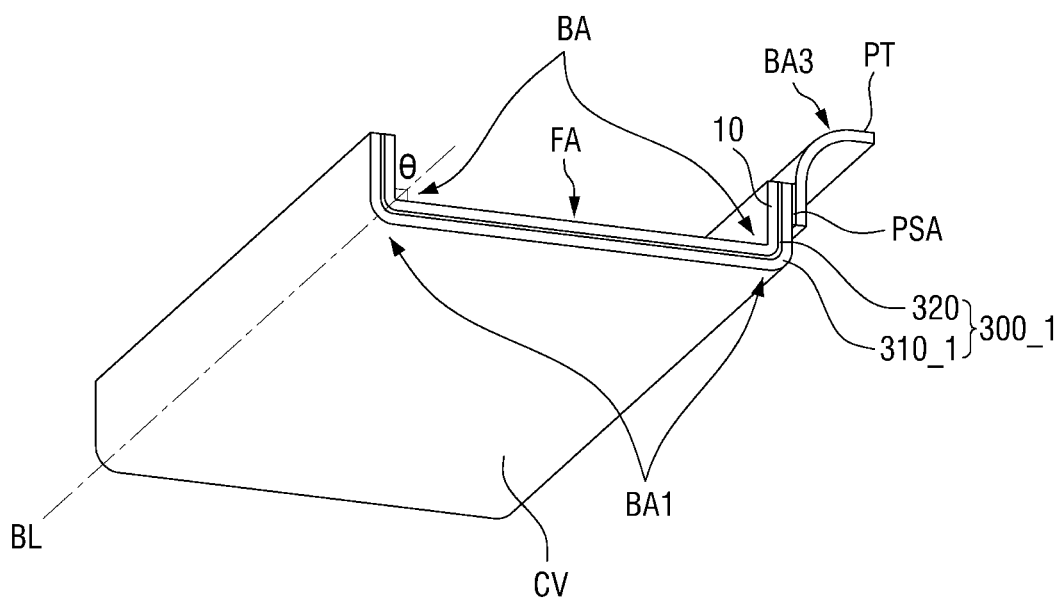
FIG. 15 is a perspective view illustrating a state in which a panel lower sheet and a protective film are pre-formed according to an alternative exemplary embodiment.
Figure 16:
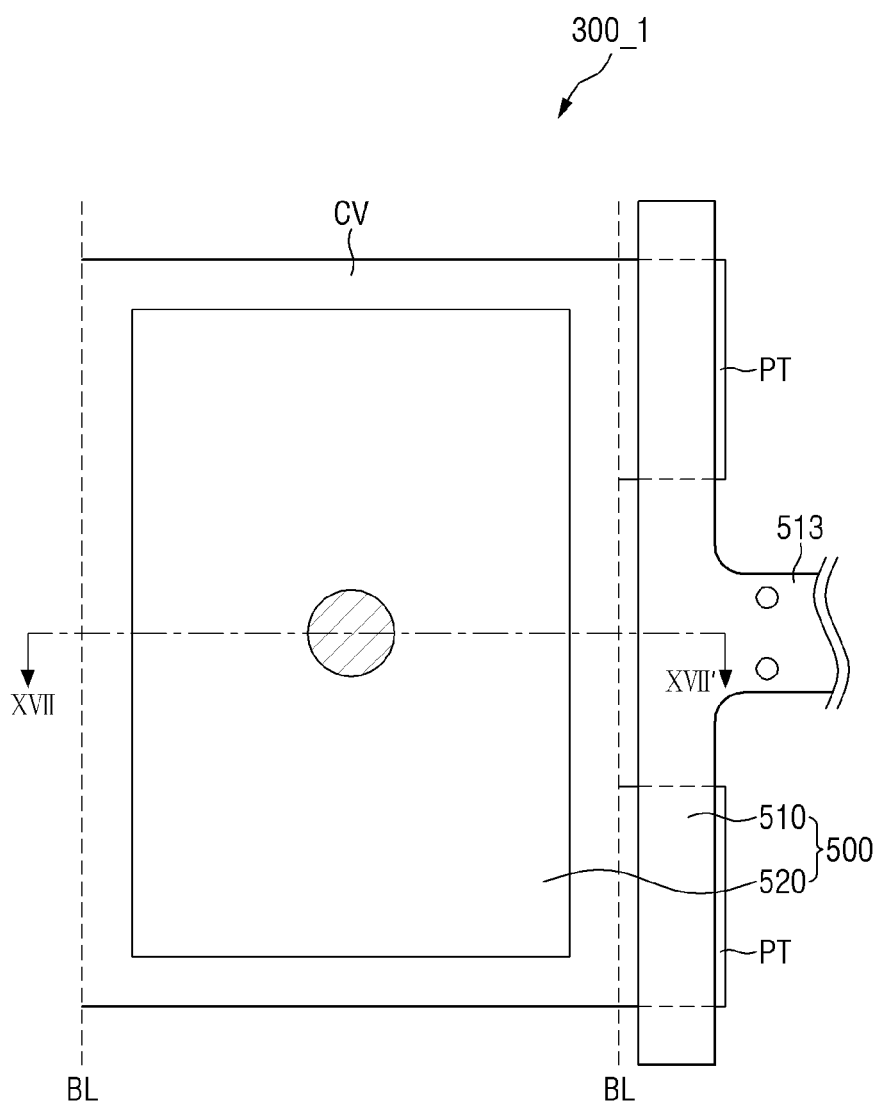
FIG. 16 is a plan view illustrating a state in which a clamping device grips a protective film according to an alternative exemplary embodiment.
Figure 17:
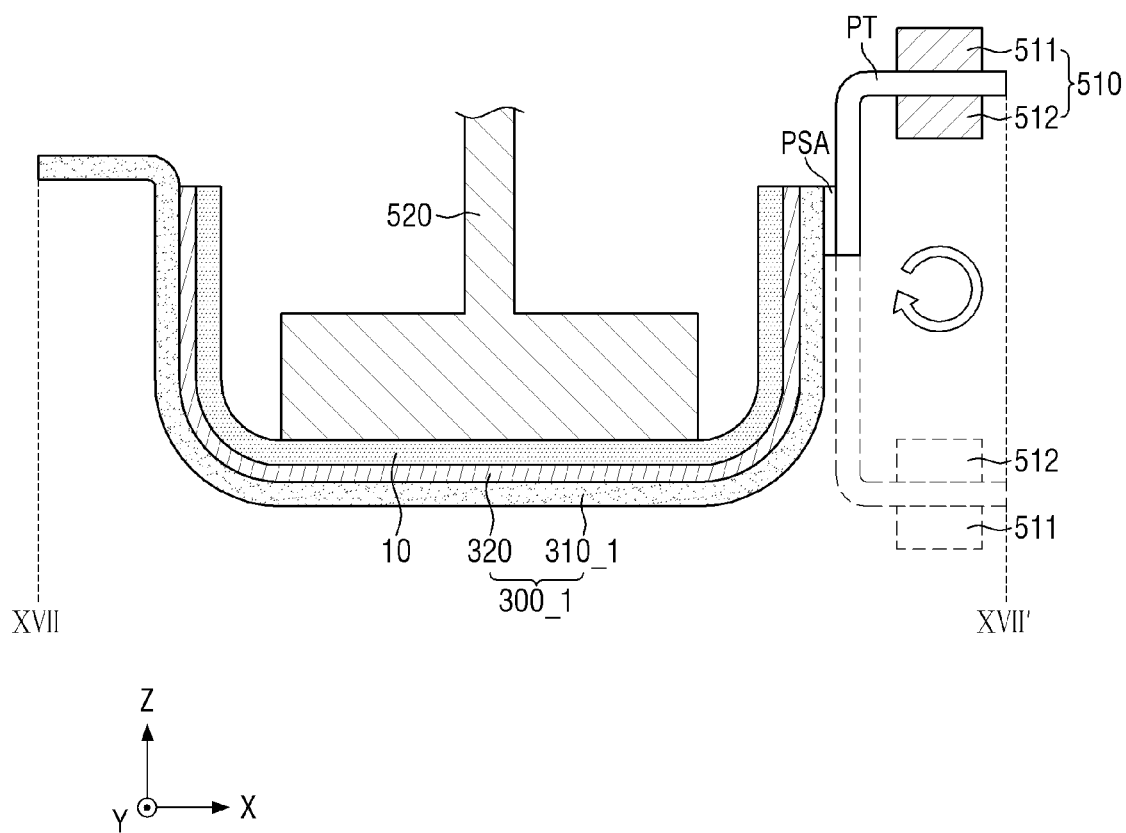
FIGS. 17 and 18 are cross-sectional views illustrating a process of peeling off a protective film according to an alternative exemplary embodiment.
Figure 18:
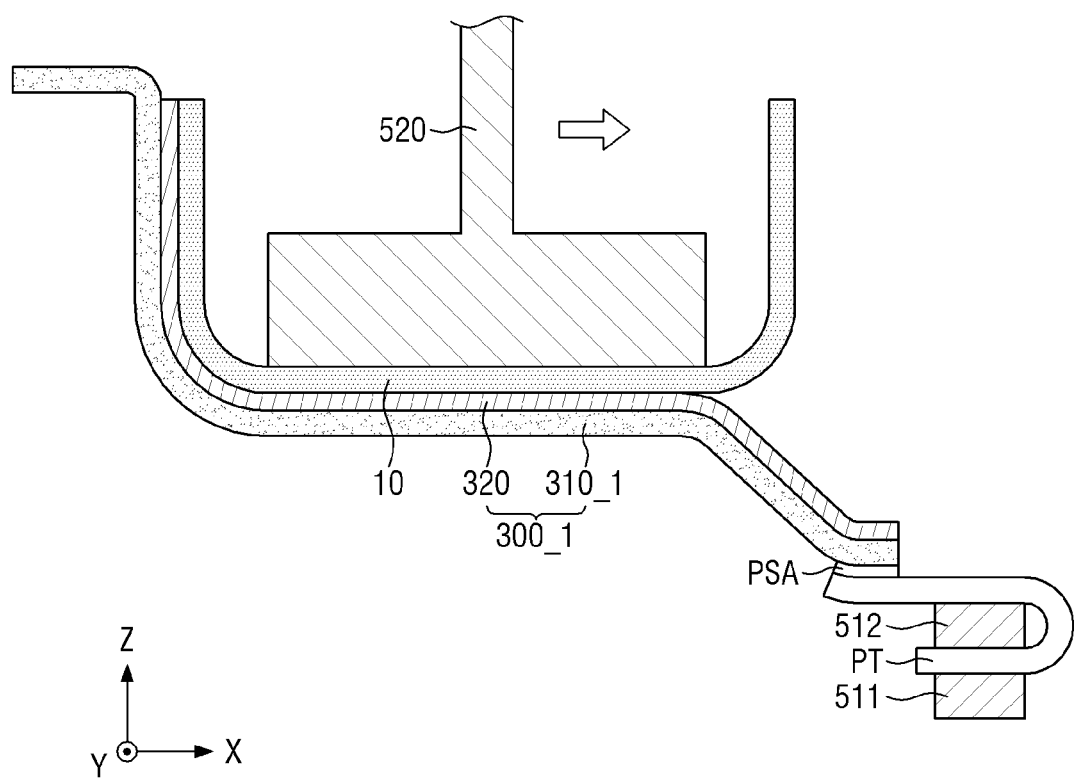

FIGS. 14A and 14B are views illustrating a side cutting process according to an alternative exemplary embodiment. FIG. 15 is a perspective view illustrating a state in which a panel lower sheet and a protective film are pre-formed according to an alternative exemplary embodiment. FIG. 16 is a plan view illustrating a state in which a clamping device grips a protective film according to an alternative exemplary embodiment. FIGS. 17 and 18 are cross-sectional views illustrating a process of peeling off a protective film according to an alternative exemplary embodiment.

Referring to FIGS. 14A and 14B to 18, an exemplary embodiment shown in FIGS. 14A and 14B to 18 is substantially the same as the exemplary embodiments described above with reference to FIGS. 10 to 13 except that a panel lower sheet and a protective film, which are pre-formed, have a configuration in which a side cutting operation is further performed and a pull tab portion is further provided.

In an exemplary embodiment, referring to FIGS. 7, 9A, 9B, and 14 to 18, the pre-formed panel lower sheet 10 is provided (S100).

Referring to FIGS. 9A and 9B, the panel lower sheet 10 to which the protective film 300 is attached may be pre-formed to have a set shape. Here, the "set shape" means a shape corresponding to a shape of a product to be transferred, i.e., an inner shape of the display panel 20 (see FIG. 2).

Referring back to FIG. 9A, in such an embodiment, a pre-forming device 400, which is driven to vertically press the panel lower sheet 10 to which the protective film 300 is attached, may be used in the operation of pre-forming the panel lower sheet 10 to which the protective film 300 is attached. Here, the pre-forming device 400 may include a pre-forming upper body 410 and a pre-forming lower body 420. The upper body 410 and the lower body 420 include heating devices capable of applying heat to the panel lower sheet 10 to which the protective film 300 is attached.

In such an embodiment, the pre-forming lower body 420 may be disposed below the panel lower sheet 10 to which the protective film 300 is attached and may have a groove corresponding to an inner sectional shape of the panel lower sheet 10 (see FIG. 2). In such an embodiment, the pre-forming upper body 410 may be disposed on the panel lower sheet 10 to which the protective film 300 is attached and may be formed to have a protrusion protruding toward the groove.

As described above with reference to FIG. 9B, the pre-forming upper body 410 presses an upper surface of the panel lower sheet 10 to which the protective film 300 is attached, and thus, the panel lower sheet 10 to which the protective film 300 is attached may be pre-formed to have the set shape between the pre-forming upper body 410 and the pre-forming lower body 420.

Referring to FIGS. 14A and 14B, a protective film 300_1 attached to the pre-formed panel lower sheet 10 in a previous operation may be side-cut to have a set size. Here, the term "side cutting" refers to a process of cutting and removing side ends (that is, both side ends) of the pre-formed protective film 300_1 to correspond to both ends of the panel lower sheet 10. That is, both side surplus portions of the protective film 300_1, which extend further from both ends of the panel lower sheet 10, may be removed.

In an exemplary embodiment, as shown in FIG. 14A, a side cutter 430 may be used. The side cutter 430 is a cutting tool configured to horizontally move toward side ends 300' of the protective film 300_1 from side to side and remove both unnecessary side ends 300' except only a portion corresponding to a range of both side ends of the panel lower sheet 10.

Referring to FIG. 14B, a sectional shape of the protective film 300_1, of which the side ends 300' are removed and which is side-cut to a size corresponding to the both side ends of the panel lower sheet 10, may be confirmed.

Referring to FIGS. 15 and 16, the protective film 300_1 pre-formed together with the panel lower sheet 10 may include a pull tab portion PT at one long side thereof extending in the Y-axis direction. The pull tab portion PT may be coupled to a film layer 310_1 of the protective film 300_1 by a coupling layer PSA. A bonding force of a film coupling layer 320 to the panel lower sheet 10 may be less than a bonding strength of the film coupling layer 320 to a coupling layer PSA.

The pull tab portion PT protrudes outward from the cover portion CV of the protective film 300_1 when viewed from above. That is, the pull tab portion PT does not overlap the cover portion CV when viewed from above. Since the pull tab portion PT protrudes from the protective film 300_1, when the protective film 300_1 is peeled off from the panel lower sheet 10, stress applied to the protective film 300_1 may be dispersed. Since the pull tab portion PT is separately formed in a partial region of the protective film 300_1, a release force of a region in which the pull tab portion PT is disposed may be different from a release force of a region in which the pull tab portion PT is not disposed. Accordingly, an initial release force may be reduced.

The number and positions of the pull tab portion PT are not particularly limited. In an exemplary embodiment, as shown in FIG. 16, two pull tab portions PT may be provided at one long side of the pre-formed protective film 300_1, which extends in the Y-axis direction, but the number and positions of the pull tab portions PT may be variously modified in consideration of the convenience and stability of a peeling process.

The protective film 300_1 pre-formed together with the panel lower sheet 10 may include a plurality of bending regions. In one exemplary embodiment, for example, the panel lower sheet 10 may have a rectangular shape when viewed from above. The panel lower sheet 10 may have both long sides and both short sides. The panel lower sheet 10 may include bending portions BA at both long sides thereof. As shown in FIG. 15, a bending angle θ of the bending portion BA may be about 90° but is not limited thereto. The bending angle θ may be an obtuse angle such as about 120°. The protective film 300_1 may form a first bending region BA1 along a shape of the bending portion BA of the panel lower sheet 10. In an exemplary embodiment, the pull tab portion PT may form a third bending region BA3 bent in an outward direction of the protective film 300_1.

Then, the protective film 300_1 of the pre-formed panel lower sheet 10 is peeled off to expose one surface of the panel lower sheet 10 (S200). FIGS. 16 to 18 are schematic views illustrating a process of peeling off the protective film 300_1 from the pre-formed panel lower sheet 10.

Referring to FIGS. 16 to 18, when a peeling robot 500 grips a grip portion GR to peel the protective film 300_1 off, the protective film 300_1 is separated from one surface of the panel lower sheet 10.

In such an embodiment, the pre-formed panel lower sheet 10 is placed on a stage (not shown). The pre-formed panel lower sheet 10 may be placed on the stage using the robot 500 or the like.

According to an exemplary embodiment, a vacuum suction device 520 may be placed on the upper surface of the pre-formed panel lower sheet 10. The vacuum suction device 520 may support and fix the pre-formed panel lower sheet 10. The vacuum suction device 520 may maintain a degree of vacuum such that a shape of the pre-formed panel lower sheet 10 is not deformed. In such an embodiment, the vacuum suction device 520 may transfer the adsorbed panel lower sheet 10 from one point to the other point.

Then, a clamping device 510 may grip the grip portion GR of the pre-formed panel lower sheet 10 fixed by the vacuum suction device 520. The clamping device MO may include an upper plate 511, a lower plate 512 opposite to the upper plate 511, and a transmission member 513 configured to adjust a distance between the upper plate 511 and the lower plate 512. In such an embodiment, the clamping device 510 may move the gripped protective film 300_1 from one point to another point.

One side of the clamping device 510 may be disposed parallel to a bending line BL of the protective film 300_1. A length of the clamping device 510 in a Y-axis direction may be greater than a length of a long side of the protective film 300_1, which extends in the Y-axis direction. Therefore, when the clamping device 510 grips the pull tab portion PT, the clamping device 510 may have a gripping force which is uniformly applied to an entire region of the protective film 300_1.

The clamping device 510 may be rotated in a clockwise direction while gripping the pull tab portion PT. In such an embodiment, As described above, the bonding force of the film coupling layer 320 to the panel lower sheet 10 may be less than the bonding force of the film coupling layer 320 to the film layer 310. As a result, as the clamping device 510 is rotated in the clockwise direction, peeling the protective film 300_1 off from the panel lower sheet 10 may be started. The peeling of the protective film 300_1 off from the panel lower sheet 10 may be easily performed when the clamping device 510 is rotated the clockwise direction.

Then, the vacuum suction device 520 may move in the X-axis direction while supporting and fixing the panel lower sheet 10. In such an embodiment, the X-axis direction may be a direction orthogonal to a boundary line L between the cover portion CV and the grip portion GR of the protective film 300_1. Since one end of the protective film 300_1 is fixed by the clamping device 510, while the vacuum suction device 520 moves in the X-axis direction, the protective film 300_1 may be continuously peeled off from the panel lower sheet 10. A movement distance of the vacuum suction device 520 in the X-axis direction is sufficient as long as the protective film 300_1 is completely peeled off from the panel lower sheet 10.

A release force generated when the protective film 300_1 is peeled off from the panel lower sheet 10 includes normal stress acting in a direction perpendicular to a surface and shear stress acting parallel to a surface as if pushing the surface According to an exemplary embodiment of a method of peeling off the protective film, a phenomenon that the protective film 300_1 is not peeled off from the pre-formed panel lower sheet 10 may be reduced, thereby reducing a probability that the panel lower sheet 10 is damaged. When the clamping device 510 grips the pull tab portion PT, one side of the clamping device 510 may be parallel to the bending line BL of the protective film 300_1, and a movement direction of the vacuum suction device 520 may be perpendicular to the bending line BL of the protective film 300_1. Therefore, most of a force generated when the protective film 300_1 is peeled off from the panel lower sheet 10 is normal stress, and shear stress is barely generated. That is, since a peeling direction is perpendicular to a bending line BL of the protective film 300_1, normal stress may be generated in all regions of the flat portion FA and the bending portion BA of the protective film 300.

Although not shown, if the grip portion GR is formed at one side of the pre-formed panel lower sheet 10 extending in the X-axis direction, one side of the clamping device 510 may be perpendicular to the boundary line L between the cover portion CV and the grip portion GR of the protective film 300_1. In this case, a movement direction of the vacuum suction device 520 may be parallel to the boundary line L between the cover portion CV and the grip portion GR of the protective film 300_1. Accordingly, when the protective film 300_1 is peeled off from the panel lower sheet 10, a considerable amount of shear stress as well as vertical stress may be generated. That is, since the peeling direction is parallel to the bending line BL of the protective film 300_1, vertical stress may be generated in the flat portion FA of the protective film 300_1, and vertical stress as well as shear stress may be generated in the bending portion BA of the protective film 300_1. When the protective film 300_1 is broken during peeling the protective film 300_1 off, an automation process is stopped, and thus, a production yield may be lowered. Even if the protective film 300_1 is not broken during peeling the protective film 300_1 off, when a release force generated in the bending portion BA of the protective film 300_1 is strong, the protective film 300_1 may not be peeled off and the panel lower sheet 10 may be bent and damaged.

In an exemplary embodiment, a display panel is attached on one surface of the panel lower sheet 10 (S300). The display panel 20 may be an organic light-emitting display panel, a liquid crystal display panel, or the like. The display panel 20 may be attached to one surface of the panel lower sheet 10 through an through an OCA or an OCR.

According to an exemplary embodiment of a panel lower sheet including a protective film, a release force is reduced when the protective film is peeled off.

In an exemplary embodiment, a method of peeling off a protective film, a release force is reduced when the protective film including a protective film is peeled off.

The invention should not be construed as being limited to the embodiments set forth herein. Rather, these embodiments are provided so that this disclosure will be thorough and complete and will fully convey the concept of the invention to those skilled in the art.

While the inventions have been particularly shown and described with reference to some embodiments thereof, it will be understood by one of ordinary skill in the art that various changes in form and detail may be made therein without departing from the spirit and scope of the invention as defined by the following claims.

What is claimed is:

1. A method of peeling off a protective film, the method comprising:
   providing a panel lower sheet, wherein a protective film is provided on one surface of the panel lower sheet, and the protective film has a bending line extending in a first direction parallel to opposing sides of the protective film;
   gripping a portion of the protective film;
   moving the gripped portion of the protective film in a second direction; and
   moving the panel lower sheet in a third direction perpendicular to the bending line,
   wherein the second direction intersects with a plane defined by the first direction and the third direction, the plane corresponding to a plane defining the gripped portion of the protective film, and
   the third direction is in a direction toward the gripped portion of the protective film.

2. The method of claim 1, wherein the providing the panel lower sheet comprises pre-forming the panel lower sheet in a set shape such that the bending line is formed.

3. The method of claim 1, wherein the gripping of the portion of the protective film comprises gripping the portion of the protective film using a clamping device in a way such that one side of the clamping device is parallel to the bending line.

4. The method of claim 3, wherein the protective film comprises a cover portion which overlaps the panel lower sheet in the second direction.

5. The method of claim 4, wherein
   a pull tab portion is defined at one end of the cover portion, and
   the clamping device grips the pull tab portion.

6. The method of claim 4, wherein the protective film further comprises a grip portion which does not overlap the panel lower sheet in the second direction and extends outward from the panel lower sheet.

7. The method of claim 6, wherein a boundary line between the cover portion and the grip portion is parallel to the bending line.

8. The method of claim 6, wherein a length of one side of the clamping device in the first direction is greater than a length of one side of the grip portion in the first direction.

9. The method of claim 3, wherein the clamping device is rotatable about one axis.

10. The method of claim 1, wherein the moving of the panel lower sheet comprises supporting and fixing the one surface of the panel lower sheet by a vacuum suction device.

11. The method of claim 10, wherein the moving of the panel lower sheet further comprises moving the vacuum suction device in the third direction.

12. The method of claim 1, wherein the protective film comprises a film layer and an adhesive layer.

13. The method of claim 12, wherein
   the film layer is attached to the one surface of the panel lower sheet via the adhesive layer, and
   a bonding force of the adhesive layer to the one surface of the panel lower sheet is less than a bonding force of the adhesive layer to the film layer.

14. The method of claim 1, wherein the panel lower sheet comprises a flat portion and a bending portion.

15. The method of claim 14, wherein an angle formed between one surface of the flat portion and one surface of the bending portion is in a range of about 90° to about 120°.

16. A method of manufacturing a display device, the method comprising:
   providing a panel lower sheet, wherein a protective film is provided on one surface of the panel lower sheet and the protective film is pre-formed to have a bending line extending in a first direction parallel to opposing sides of the protective film;
   peeling off the protective film; and
   after the peeling off of the protective film, attaching a display panel to the one surface of the panel lower sheet,
   wherein the peeling off of the protective film comprises:
   gripping a portion of the protective film using a clamping device in a way such that one side of the clamping device is parallel to the bending line,
   moving the gripped portion of the protective film in a second direction, and
   moving the panel lower sheet in a third direction perpendicular to the bending line,
   wherein the second direction intersects with a plane defined by the first direction and the third direction, the plane corresponding to a plane defining the gripped portion of the protective film, and
   the third direction is in a direction toward the gripped portion of the protective film.

17. The method of claim 16, wherein the protective film comprises a cover portion which overlaps the panel lower sheet in the second direction.

18. The method of claim 17, wherein the protective film further comprises a grip portion which does not overlap the panel lower sheet in the second direction and extends outward from the panel lower sheet.

19. The method of claim 18, wherein a boundary between the cover portion and the grip portion is parallel to the bending line.

20. The method of claim 19, wherein a length of one side of the clamping device in the first direction is greater than a length of one side of the grip portion in the first direction.

* * * * *